May 9, 1961

F. E. SLATER ET AL 2,983,399

SEAL FOR ELECTRIC OUTLET BOX

Filed April 20, 1959

INVENTORS.
FRANK E. SLATER
PATRICK J. KENNELLY
BY
H. G. Manning
ATTORNEY.

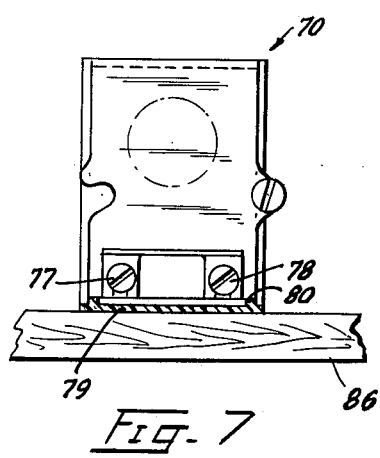
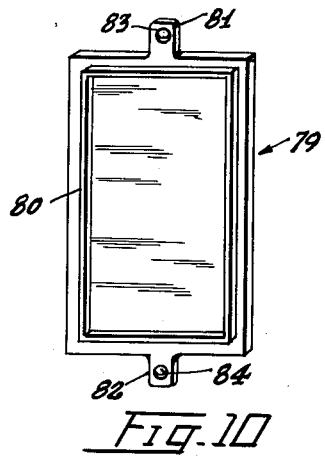
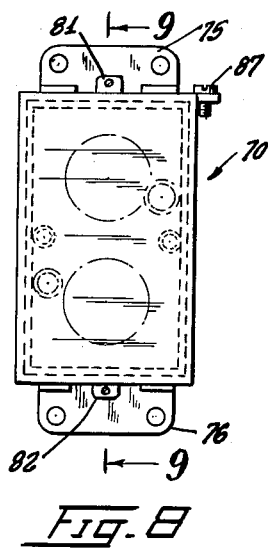
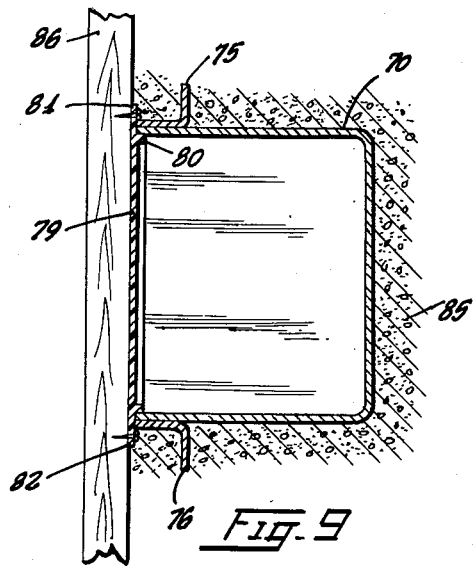

United States Patent Office 2,983,399
Patented May 9, 1961

2,983,399

SEAL FOR ELECTRIC OUTLET BOX

Frank E. Slater, 26 Peach St., and Patrick J. Kennelly, 52 Whitecroft Lane, both of Waterbury, Conn.

Filed Apr. 20, 1959, Ser. No. 807,459

1 Claim. (Cl. 220—3.4)

This invention relates to an electric outlet box employing flexible sealing gasket discs at the open ends thereof for use during the pouring of concrete around the box.

One object of the present invention is to provide an electric outlet box of the above nature which is open at both ends and in which a pair of soft sealing gasket plates are located in said open ends, which gaskets are provided with ribs extending into the box to serve as barriers to prevent concrete from entering the box.

A further object is to provide an electric outlet box of the above nature in which the ribbed sealing gasket plate at the bottom of the box is temporarily secured to the box by screws, said screws being located within curved recesses of the ribs embracing said screws.

A further object is to provide an electric outlet box of the above nature which is polygonal in shape and made in two sections, and in which the ribs are formed with four angular discontinuous portions which overlap at the joints or seams of the two sections of the box.

A further object is to provide an electric outlet box of the above nature which will be simple in construction, inexpensive to manufacture, easy to install and manipulate, compact, ornamental in appearance, and very efficient and durable in use.

With these and other objects in view, there have been illustrated on the accompanying drawings, three forms in which the invention may conveniently be embodied in practice.

In the drawings:

Fig. 7 is a top plan view of a third form of sealed electric outlet box of rectangular shape.

Fig. 8 is a front view of the same, showing in dotted lines two pairs of opposed conduits for the electrical conductors to be installed therein.

Fig. 9 is a cross-sectional view taken along the line 9—9 of Fig. 8.

Fig. 10 is a perspective view of the rectangular soft sealing gasket plate employed at the open end of the box shown in Fig. 7.

*First form*

Figure 1:
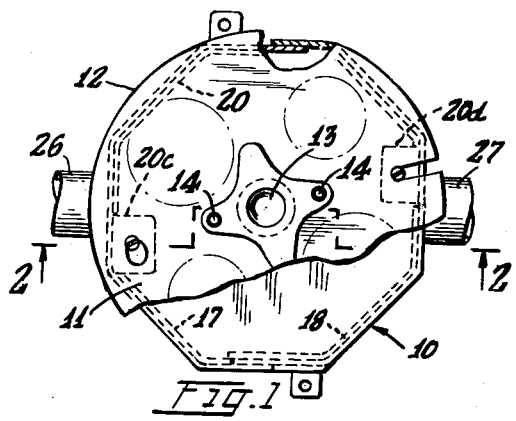
Fig. 1 represents a top plan view of the first form of sealed electric outlet box which is octagonal in shape.

Referring now to the drawings, in which like reference numerals denote corresponding parts throughout the several views, the first form of the invention employs a pair of flexible soft plastic sealing gaskets for location at the open top and bottom ends of the box. The box 10 of this form is preferably octagonal in shape and formed in two overlapping sections secured together, as by spot welding (see Fig. 1).

Provision is also made of a metal top cover plate 11 of octagonal shape having an overhanging outer flange 12. The top plate 11 has a central hole 11a into which a hollow threaded fixture stud 13 is fitted, said stud having four radial arms secured by rivets 14 to the top cover plate 11. Beneath the top cover plate 11, provision is made of a top sealing gasket 15 of soft flexible material, such as plastic, rubber, or cork, said gasket also having a central hole 16 to fit around the hollow stud 13. The gasket 15 is provided with two pairs of depending abutting ribs 17, 18 and 19, 20, the rib sections 17, 20 and 18, 19 being spaced apart to embrace screw holes 20a and 20b in the inturned ears 20c and 20d of the top of the box 10.

Provision is also made of a flexible soft bottom gasket 21 of octagonal shape, having no central hole, and provided with upstanding ribs 22 similar to the ribs 17, 18, 19, 20.

Figure 2:
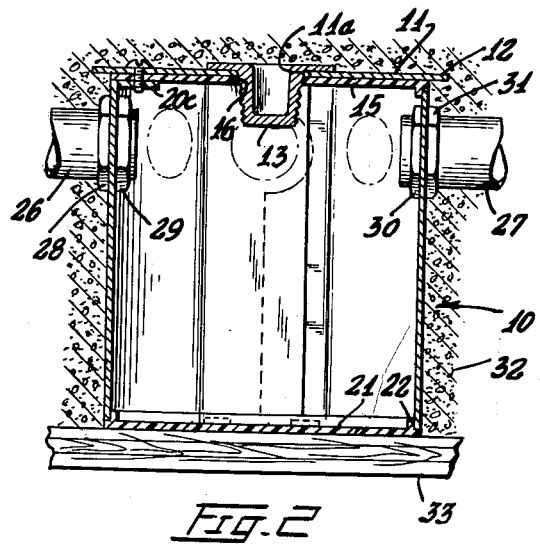
Fig. 2 is a cross-sectional view of the same, taken along the line 2—2 of Fig. 1.

The numerals 26 and 27 indicate a pair of opposed conduits for leading the electrical conductors into and out of the box 10, said conduits being secured in place by lock nuts 28, 29, 30 and 31 respectively, located on the outer and inner sides of the box 10. The numeral 32 indicates a mass of concrete which is poured around the box 10, which as clearly shown in Fig. 2, is secured to a removable wooden form 33, which temporarily supports the concrete of the building construction, while the concrete 32 is being poured around the metal outlet box 10. After the concrete has set, the form 33, along with lower sealing gasket 21 will be removed and may be used over again.

*Second form*

Figure 4:
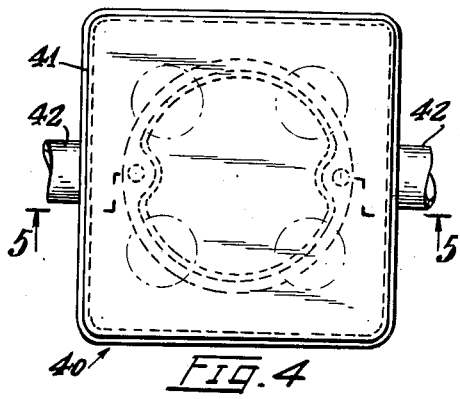
Fig. 4 is a top plan view of the second form of sealed electric outlet box, which is square in shape, also embodying the invention.
Figure 5:
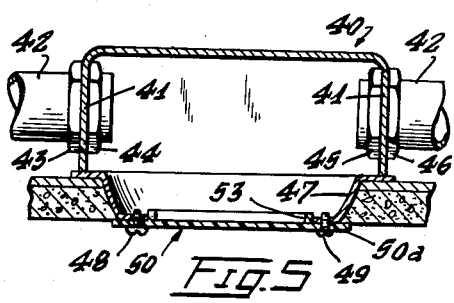
Fig. 5 is a cross-sectional view of the same, taken along the line 5—5 of Fig. 4.
Figure 6:
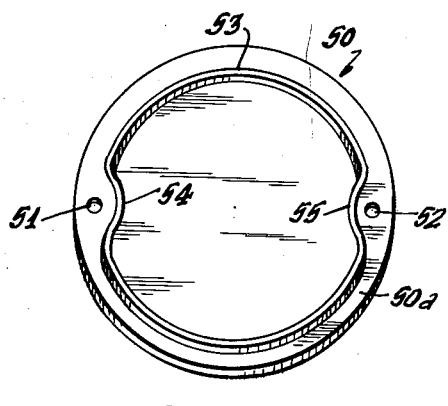
Fig. 6 is a perspective view of the circular bottom sealing gasket plate of the second form of the invention, shown by itself.
Figure 3:
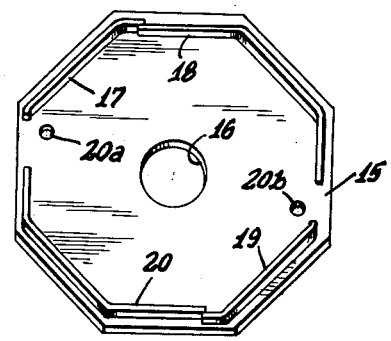
Fig. 3 is a perspective view of the upper octagonal sealing gasket plate, shown by itself.

In the second form of the invention shown in Figs. 4, 5 and 6, provision is made of a square outlet box 40, having opposite vertical walls 41, through which conduits 42 are adapted to extend, said conduits being held in place by nuts 43, 44, 45, 46. A circular flexible soft gasket plate 50 is mounted on the bottom cover 47 and has an outer flange 50a, which is secured to said cover by means of screws 48, 49, said gasket having a continuous rib 53 upstanding therefrom, provided with curved inturned sections 54, 55 to embrace the screws 48, 49 which pass through the screw holes 51, 52.

*Third form*

In the third form of the invention, a rectangular metal outlet box is used, as indicated by the numeral 70. Provision is also made of a pair of angle support brackets 75, 76, which are secured by screws 77, 78 to the wooden form 86 for temporarily supporting the box in operating position.

Provision is also made of a rectangular soft plastic gasket 79 having an inturned rib 80 and ears 81, 82 provided with screw holes 83, 84 to receive wood screws for temporarily securing the gasket 79 to said wood form 86.

While there have been disclosed in this specification several forms in which the invention may be embodied, it is to be understood that these forms are shown for the purpose of illustration only, and that the invention is not limited to the specific disclosures, but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

In an electric outlet box adapted to be embedded in a concrete wall and in which said outlet box has an open end, a cover plate for closing said open end, and a separate flexible sealing gasket plate of soft material secured to said cover plate, said gasket plate having an integral inwardly extending sealing rib spaced inwardly from the peripheral edge thereof a distance substantially equal to the thickness of the box wall, said rib contacting the inner surface of said box at said open end and serving as a barrier to prevent the entrance of concrete during the pouring operation, and means securing said cover plate and said gasket plate to the open end of the box.

References Cited in the file of this patent

UNITED STATES PATENTS

| | | |
|---|---|---|
| 1,471,340 | Knight | Oct. 23, 1923 |
| 1,494,412 | Boyton | May 20, 1924 |
| 1,724,307 | Peterson | Aug. 13, 1929 |
| 1,862,811 | Strong | June 14, 1932 |
| 2,038,291 | Hooley | Apr. 21, 1936 |
| 2,204,006 | Allen | June 11, 1940 |